United States Patent

Kisley et al.

(10) Patent No.: US 10,256,981 B2
(45) Date of Patent: Apr. 9, 2019

(54) SECURE LOGGING FOR HOST SECURITY MODULE

(71) Applicant: International Business Machines Corporation, Armonk, NY (US)

(72) Inventors: Richard V. Kisley, Charlotte, NC (US); Mark D. Marik, Denver, NC (US); Michael J. Miele, Concord, NC (US); Tamas Visegrady, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 15/277,215

(22) Filed: Sep. 27, 2016

(65) Prior Publication Data

US 2018/0091311 A1 Mar. 29, 2018

(51) Int. Cl.
G06F 21/00 (2013.01)
H04L 9/32 (2006.01)
G06F 21/72 (2013.01)
G06F 17/30 (2006.01)
G06F 21/64 (2013.01)

(52) U.S. Cl.
CPC ...... *H04L 9/3252* (2013.01); *G06F 17/30185* (2013.01); *G06F 21/64* (2013.01); *G06F 21/72* (2013.01); *G06F 2221/2101* (2013.01); *G06F 2221/2151* (2013.01)

(58) Field of Classification Search
CPC ................................ G06F 21/64; G06F 21/72
See application file for complete search history.

(56) References Cited

U.S. PATENT DOCUMENTS

| | | | |
|---|---|---|---|
| 7,222,238 B2 | 5/2007 | Bleumer et al. | |
| 8,554,748 B1* | 10/2013 | Kamity | G06F 9/44578 707/694 |
| 9,196,116 B2 | 11/2015 | Szrek et al. | |
| 9,660,970 B1* | 5/2017 | Rubin | H04L 63/062 |
| 2002/0147645 A1* | 10/2002 | Alao | G06Q 30/0209 705/14.54 |
| 2008/0114981 A1* | 5/2008 | Hars | G06F 21/64 713/170 |
| 2008/0126431 A1* | 5/2008 | Walliser | G06F 11/1451 |
| 2008/0243751 A1 | 10/2008 | Gormish et al. | |
| 2010/0070769 A1 | 3/2010 | Shima et al. | |
| 2014/0095771 A1* | 4/2014 | Lee | G06F 12/0804 711/103 |
| 2015/0193336 A1* | 7/2015 | Zhou | G06F 11/0706 711/103 |

(Continued)

FOREIGN PATENT DOCUMENTS

CN 102648471 B 8/2012

*Primary Examiner* — Ali Shayanfar
(74) *Attorney, Agent, or Firm* — Cantor Colburn LLP; William Kinnaman

(57) ABSTRACT

Embodiments include method, systems and computer program products for secure logging of host security module. In some embodiments, an event may be received. The event may include data to be written to a secure log file. A hash may be generated using data of the event. The hash may be stored in a first field of an event record associated with the event. The event record may be stored in the secure log file. The hash may be stored in a second field of a next event record in the secure log file.

17 Claims, 4 Drawing Sheets

(56) References Cited

U.S. PATENT DOCUMENTS

| | | | |
|---|---|---|---|
| 2015/0254013 A1* | 9/2015 | Chun | G06F 3/0619 |
| | | | 711/103 |
| 2015/0301748 A1* | 10/2015 | Lee | G06F 3/0688 |
| | | | 711/103 |
| 2015/0319166 A1* | 11/2015 | Arnold | H04L 63/0853 |
| | | | 713/159 |
| 2016/0188462 A1* | 6/2016 | Shin | G06F 12/0269 |
| | | | 707/820 |
| 2017/0139616 A1* | 5/2017 | Dubeyko | G06F 3/0619 |
| 2017/0177225 A1* | 6/2017 | Mehta | G06F 3/0604 |
| 2017/0255636 A1* | 9/2017 | Chun | G06F 17/30082 |
| 2018/0091311 A1* | 3/2018 | Kisley | H04L 9/3252 |

* cited by examiner

US 10,256,981 B2

SECURE LOGGING FOR HOST SECURITY MODULE

BACKGROUND

The present disclosure relates to methods, systems, and computer program products for secure logging for a host security module.

A hardware or host security module (HSM) may be a physical computing device that safeguards and manages digital keys for strong authentication and may provide cryptoprocessing. Example functions of an HSM may include onboard secure cryptographic key generation, onboard secure cryptographic key storage and management, use of cryptographic and sensitive data material, and offloading application servers for complete asymmetric and symmetric cryptography.

SUMMARY

In accordance with an embodiment, a method for secure logging in a host security module is provided. The method may include receiving an event, either generated by the HSM or received externally from the HSM, wherein the event comprises data to be written to a secure log file; generating a hash using data of the event; storing the hash in a first field of an event record associated with the event, wherein the event record is stored in the secure log file; and storing the hash in a second field of a next event record in the secure log file.

In another embodiment, a computer program product may comprise a storage medium readable by a processing circuit and storing instructions for execution by the processing circuit for performing a method that may include receiving an event, wherein the event comprises data to be written to a secure log file; generating a hash using data of the event; storing the hash in a first field of an event record associated with the event, wherein the event record is stored in the secure log file; and storing the hash in a second field of a next event record in the secure log file.

In another embodiment, a system for optimizing persistency using hybrid memory may include a processor in communication with one or more types of memory. The processor may be configured to receive an event, wherein the event comprises data to be written to a secure log file; generate a hash using data of the event; store the hash in a first field of an event record associated with the event, wherein the record is stored in the secure log; and store the hash in a second field of a next record in the secure log.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

Figure 1:
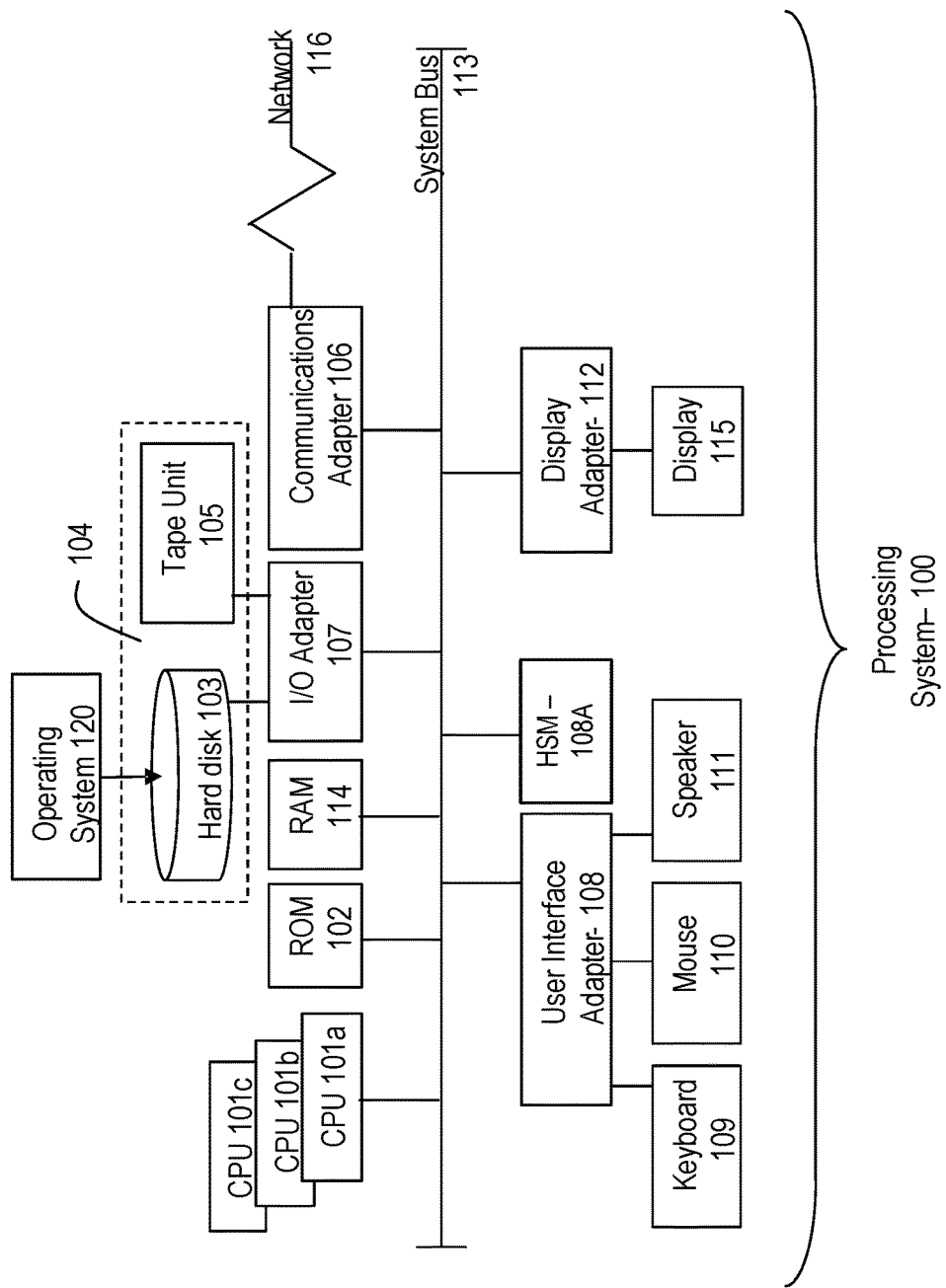
FIG. 1 is a block diagram illustrating one example of a processing system for practice of the teachings herein.

In accordance with exemplary embodiments of the disclosure, methods, systems and computer program products for secure logging in a host security module are provided. This disclosure is directed to support secure logging of transactions, data, and events to enable auditing. An HSM may be partitioned into multiple domains, represented as D. Each domain may have one secure log to track transactions, data, and events executed on a host system. A cryptographic adapter may communicate with a host system across a PCI-e bus and a secure log may be saved in a file in the adapter's flash file system and Battery Backed RAM (BBRAM) file system. The secure log may include a hash of each event record entry, which in turn is stored in the next record of the log. A digital signature algorithm, such as the elliptic curve digital signature algorithm (ECD SA), may be applied upon the hash value of a range of events that are retrieved from the secure log. The host may then verify the digital signature upon the event range that was retrieved. The host may then verify that a running_hash field in each event record is equal to the current_hash field of the immediately previous event record in the secure log. This technique may enforce the integrity of the logs by detecting deletions or modifications of event entries in the secure log.

Besides the main secure log file per domain that holds M event records per domain, there are ancillary log files that may assist in increasing the efficiency of the secure logging system. A staging file may be stored in the battery backed random access memory (BBRAM) file system and may be used to collect a group of events whose sum total in size is less than the total size of a full flash file size for a domain's events. Collecting event records in a staging BBRAM file reduces time spent saving every single event logged to the flash file since write access time to flash is typically longer than write access to BBRAM.

Overflow log files may be stored in the flash file system, one per domain. When the secure log of a domain is full, the overflow file for that domain may be utilized. The overflow file may consist of an array of 1-event slots for each event type of a set of N event types that are deemed too important to be blocked from execution whenever the log becomes full. The overflow file will hold the most recent occurrence of an event type of the set of N once the secure log is full. As newer versions of an event (e.g., firmware update event) are received, the older version may be overwritten in the overflow file using the information in the recently received event. The HSM secure logging firmware typically receives events generated by the HSM itself whenever a particular set of cryptoprocessing operations are performed within the HSM or, in some cases, may receive a request external to the HSM to generate and event. A numbering scheme may be employed to retain sequential entry numbers in the secure log during such overflows. Once the secure log of a domain is full, typically no further loggable function may be permitted to execute until space is made available in the secure log by way of retrieval and clearing either the entire log or a portion of the log starting from the oldest log entry. The exception is the case of a subset of events that are allowed to be saved into an overflow flash file consisting of N slots of 1-deep overflow event records (e.g., for each domain). The aforementioned numbering scheme may be employed during the time at which overflow events are moved into slots in the secure log made empty from event retrieval and clear operations.

In some embodiments, event records of secure logs may only be cleared or deleted under dual control and only upon those event records, which have previously been retrieved. This entails one user with a given role issuing a clear event record range request, starting from a specified sequence number, in an "inactive" state. A user may utilize an API to set the metadata of a set of records to INACTIVE and the range of event records specified to be cleared are marked with a flag in their metadata fields set to the cleared-inactive state. The API will verify that the range of events to be inactively cleared have the metadata "retrieved" flag set on before marking the event records inactive clear. In this state, the event records are not yet officially cleared, meaning that the host may still retrieve those event records multiple times (e.g. different host applications may retrieve identical event ranges or ranges that overlap each other) from the log whose metadata flag indicates that the event is in an inactive cleared state. Another host user with a different roleID can then issue a clear event range starting from a specified sequence number, in an "activate" state. The API will verify that the range of events to be cleared have the metadata "clear inactive" flag set on before marking the event records permanently cleared. Once permanently cleared, the log slots occupied by these cleared events are now reusable for future event records and the event records that once occupied these slots are no longer retrievable. The secure log may be a circular buffer in that the head (or most recent event logged) never overtakes the tail (or oldest event logged). The preferred embodiment uses a circular buffer technique, which enforces event record clearing operation starting from the oldest end of the buffer (or tail); thereby allowing new event records to be saved into the log starting from the slot immediately following the head of the circular buffer, occupying the old slots just cleared.

Clearing a log either partially or entirely may itself be a loggable operation and results in an event for these clear operations. The clear inactive function will not set the INACTIVE metadata flag in its event record at the time it is logged so as to not become part of the clearing operation attempted. If the secure log is full at the time that the inactive or activate clear operation is performed, the event record for these clear operations will be stored into the overflow secure log flash file. Thus a clear activate function will ultimately result in a secure log file having only the inactive and activate forms of the "clear" events remaining in the log, with the exception of possibly any event records logged between the times that the INACTIVE and ACTIVATE forms of the clear operation occurred.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. The host security module (HSM) 108A is connected to the system bus 113 and safeguards and manages digitals keys for strong authentication and provides crytoprocessing. The HSM is further described in FIGS. 2 and 3.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
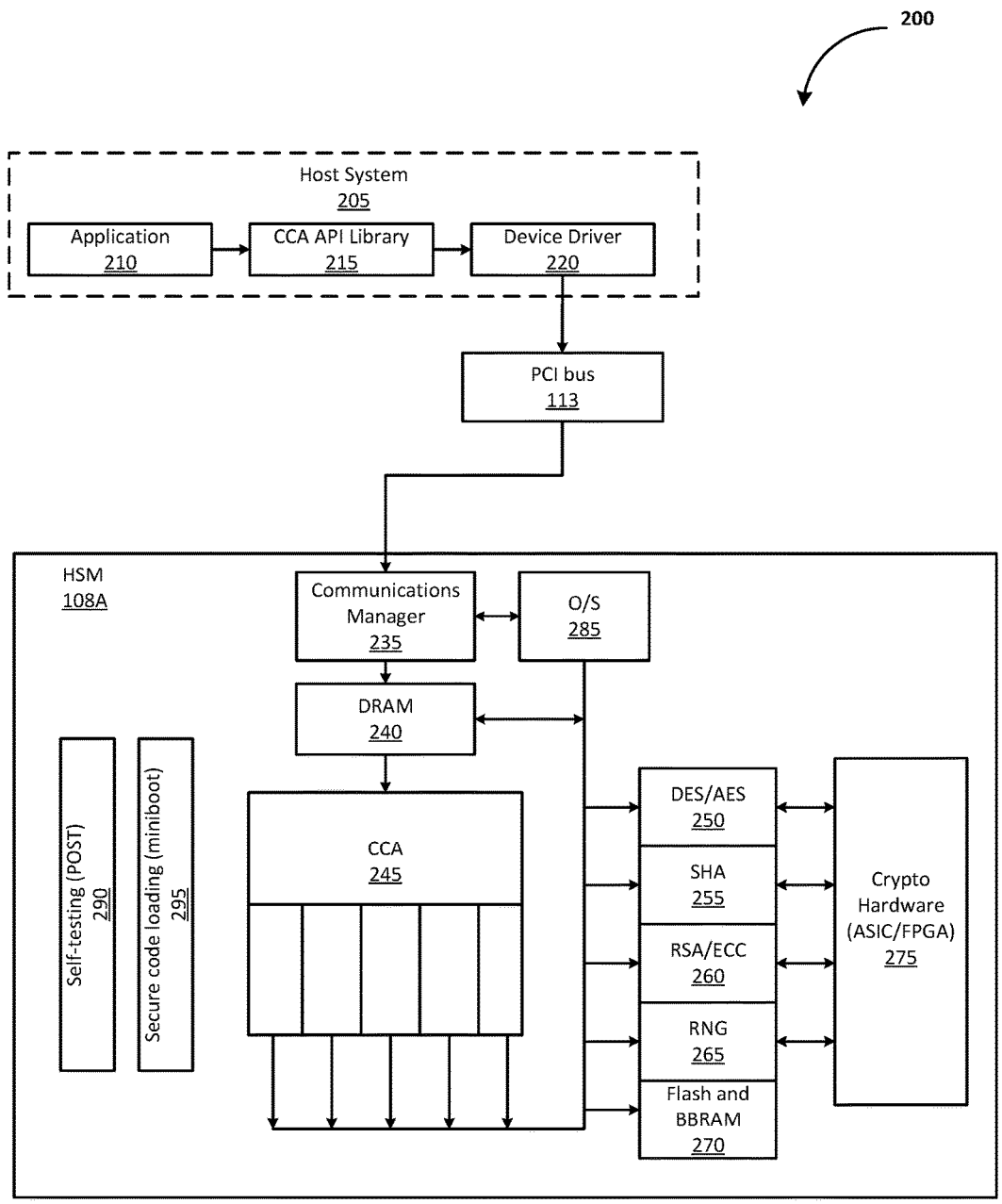
FIGS. 2 and 3 are block diagrams illustrating computing systems in accordance with exemplary embodiments.
Figure 3:
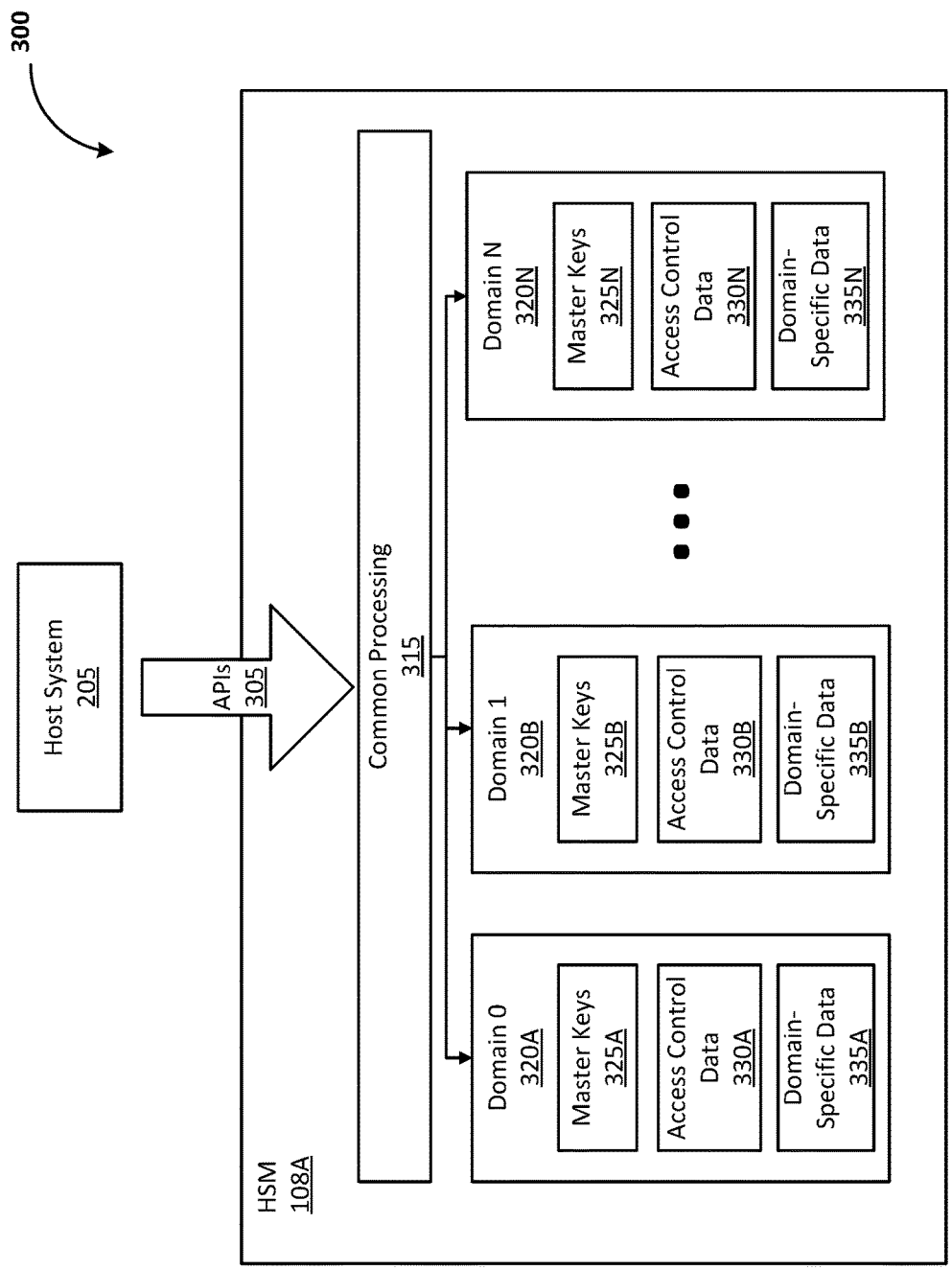

Now referring to FIGS. 2 and 3, block diagrams illustrating computing systems in accordance with exemplary embodiments are depicted. FIG. 2 depicts the host and firmware components of an exemplary embodiment of the systems and methods described herein. The HSM 108A (also known as a cryptographic adapter card) may plug into a hardware PCI-e slot in a server. A host system 205 may include an application 210, an API library 215 (e.g., common cryptographic architecture (CCA) API library), and a device driver 220 (e.g., PCI communications).

The HSM 108A may include a communications manager 235. The communications manager 235 may be a card-side PCI communications device driver which is the complement of the host side device driver 220. The HSM 108A may also include an operating system 285 and a common cryptographic architecture application program (CCA) 245. The CCA is a cryptographic-system implementation that provides functionality for the financie industry and a base on which custom processing and cryptographic functions can be added. The HSM 108A may include a self-testing (e.g., Power On Self Tests (POST)) module 290 and a secure code loading module 295. The secure code loading module 295 may be referred to as a mini boot and may be responsible for loading the executable code from flash into DRAM memory 240. The secure code loading module 295 may be responsible for uncompressing a binary image stored in flash and loading the result: O/S 285, communications manager 235, CCA 245, and card-side firmware library code that services CCA APIs to a data encryption standard or advanced encryption standard (DES/AES) component 250, secure hash algorithm (SHA) component 255, RSA/ECC 260, RNG (Random Number Generation) component 265, and Flash & BBRAM component 270, into the DRAM component 240.

The Flash and BBRAM hardware 270 may house the secure logging files. The secure logging files may include BBRAM staging files, 512-event capacity flash files, and flash overflow files (1 per domain). A BBRAM staging file consists of an array that may hold up to a predetermined number of secure events per domain. In a preferred embodiment, the predetermined number, X, may equal 10. The secure events in the BBRAM staging file may be written to a secure log in a flash file system until the secure log reaches a capacity equal to the largest multiple of 10 below the maximum secure event limit. The BBRAM secure events may be transferred to the secure log in groups of a predetermined size (e.g., X). In an example embodiment, the secure log may be capable of holding 512 events, so events may be written to the secure log in groups of ten until there 510 events in the log. The last 2 secure logs may be written directly into the secure log bringing the total to 512; after which, the next function which requires logging (per PCI-HSM compliance requirements) may either be precluded from executing, or will be allowed to execute with a resultant overflow event record created. Note that typically, one host user will be retrieving secure logs while at least two users will be needed to clear the retrieved secure logs (e.g., dual control described herein). One or both of the users may be required to clear the log (either inactively or actively) and may be allowed to retrieve the secure logs while the other user would be required to perform the complementary clear operation (inactive or activate). In some embodiments, a third user may only be allowed to retrieve the secure logs while the first user inactively clears the log and the second user actively clears the log. Authorizations that users have are dictated by the user's role settings. Overflow events may be stored in an overflow flash file for which the most recent occurrence are logged at the expense of overwriting a previous event of the same type in that overflow log (e.g. "set clock" event, or "firmware update" event), when there are already 512 event records stored in the secure log.

In some embodiments, once the secure log flash file is full, a function which the CCA 245 might be trying to execute may be prevented from executing, and a "full log" return code may be returned to the CCA 245 by the firmware code that handles secure logging upon determining the secure log is full. There are functional operation exceptions which fall into the category of being permitted to execute once the secure log is full. For example, a firmware update may need to be executed after a determination that the secure log is full. The system 200 could be rendered unusable if the firmware needed to be updated but the secure log was full, thereby precluding the firmware update. Therefore, a firmware update is one such function that is permitted to execute despite a full secure log, but only the most recent occurrence of a firmware update is logged in the overflow files of all the domains. Same holds true for setting the clock in the card. Setting the clock will be allowed despite whether the secure log is full or not. If full, only the most recent event for setting the clock will be saved in the overflow files (one overflow file per domain).

Each domain has its own flash overflow file; however, only one BBRAM staging file exists and it is partitioned as a 2-dimensional array of domain number vs. event depth. In the preferred embodiment, there are 256 domains and the depth of a domain's "staging" events is 10. The individual overflow files can handle a set of 1-deep overflow event records. The secure logs from one domain are not intermixed amongst the secure logs of another domain's secure BBRAM/flash files. Events that affect all domains may be logged in each domain's secure log file.

The crypto hardware component 275 may be the hardware component that executes all of the cryptographic functions. Examples of the crypto hardware component 275 may include a Field Programmable Gate Array (FPGA) and/or Application Specific Integrated Circuit (ASIC).

Now referring to FIG. 3, the diagram depicts a host system 205 in communication with a HSM 108A. The diagram depicts an example in which the CCA firmware 245 may partition resources for each domain (320A, 320B, 320N) such that these resources do not overlap in any way with those of other domains. The respective secure logs for each domain may be stored in the respective domain specific data components 335A, 335B, 335N, along with other domain-specific data. The partitioning may be done by firmware (e.g., saving an individual domain's resources in either DRAM 240 and/or in files located in Flash and BBRAM 270. The respective master keys (325A, 325B, 325N), for example, may be saved in DRAM 240 caches for each domain. Access control data (e.g., 330A, 330B, 330N) may include profile and role data among other things, that are stored in BBRAM files. A user may be associated with a profile , and a profile may be associated with a user role. A user role may be associated with a list of functions which the user has permission to initiate execution. Thus, user A with a given profile and role may be allowed to "inactively" clear a range of secure logs, and user B, associated with a different profile and different role may be allowed to "actively" clear a range of secure logs that were marked as inactive cleared by user A. This process is known as "dual control."

FIG. 3 depicts how the host system 205 may utilize host side APIs 305, which in turn send packets of data to the to the HSM 108A through the PCI interface 113. These packets of data may contain information that may be parsed by the CCA 245 and directing the CCA 245 to execute certain functions or events, such as "load a master key for domain D", or "set the clock."

In some embodiments, the CCA 245 may identify events that affect all domains (e.g. common processing 315 of events common to all domains of the HSM 108A). These events may be logged in each domain's secure log file. For example, if there are 256 domains, then a single firmware update or set clock operation would perforce affect all the domains, resulting in 256 firmware update events records that may be generated and stored to the respective secure logs: 1 per each of the 256 secure log files, whenever 1 firmware update occurs.

Figure 4:
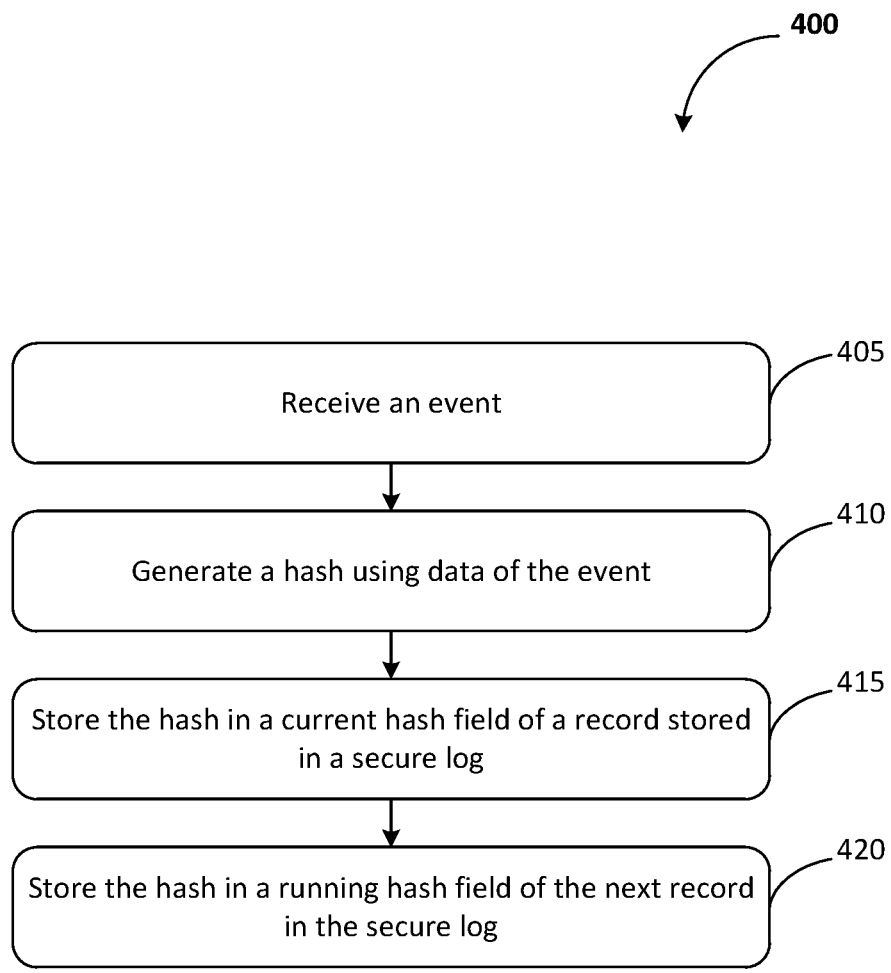
FIG. 4 is a flow diagram of a method for secure logging for a host security module in accordance with an exemplary embodiment.

Now referring to FIG. 4, a flow diagram of a method 400 for secure logging for a host security module in accordance with an exemplary embodiment is depicted.

At block 405, an event may be received. The event may contain non-security relevant characteristics about a function that is to be executed by a computing device. Examples of an event may include a firmware update, loading a master key, loading a function control vector, modification or roles and profiles, or setting the clock of the computing device. A secure log may be generated and stored in a flash file system or BBRAM file system. The secure logging process may log events of operations deemed auditable by PCI-HSM requirements. The following table depicts an example structure for event records in a secure log:

| Field | Size | Description |
|---|---|---|
| Start of Data to Hash | | |
| length; | 004 bytes. | Length of this event (including the length field itself) |
| hashedLen; | 002 bytes. | Length of the hashed area of this event record |

-continued

| Field | Size | Description |
| --- | --- | --- |
| Version; | 002 bytes. | Version of the event |
| running_hash | 064 bytes. | Sha2-512 hash of previous event (this = current_hash of previous event); 0's here for the very first event. |
| domain; | 002 bytes. | Domain number 0-255, or number 9999 for card-wide log. |
| sequence_num; | 004 bytes | Event record number. +1 with each new event record added to log. Wraps from 0xFFFFFFFF to 0. The very first sequence number after SRDI log file creation is 0. |
| roleID; | 008 bytes | Role ID. |
| userID; | 008 bytes. | Profile ID |
| cardsn; | 008 bytes | An array. Card Serial#. |
| event; | 004 bytes. | Enumerated data type for event type. |
| event_time; | 004 bytes. | Timestamp, from a call to time (NULL). |
| custDatLen; | 004 bytes. | Number of left-justified ASCII characters in custDat. |
| custDat: | 024 bytes | An array. Up to 24 characters of ASCII text, left justified and padded to the right with 0x00's |
| attribute; | 004 bytes. | Attributes (see below) |
| | End of data to hash | |
| current_hash; | 064 bytes. | An array. Hash of this event from start to end shown above (includes prior event's current_hash, which is stored in this event's running_hash). |
| metadata; | 004 bytes. | A set of bit flags that control the low level APIs; such as "event retrieved", "event has been inactively cleared", and "event has been actively cleared". |

The hash of an event may be used to protect the integrity of the sequence of event records against inadvertent or intentional event record deletions, modifications, or insertions. A hash may be computed across the content of an event record and saved in a running_hash field of the next event record in the secure log. Then, once the next event record is filled, a hash is once again computed over the content of the event, where the content includes the running_hash (e.g., the current_hash from the previous event record).

In some embodiments, a first counter may be used to track the number of events received by the HSM 108A. The first counter, which may be stored in the staging file, may be indicative of a number of events stored in the staging file and may be increased each time an event is received by the HSM 108A. In some embodiments, the first counter may be compared to a pre-determined threshold for the purpose of determining which file system to use for saving the event record. The threshold may be determined by a user or an administrator of the system. If it is determined that the first counter is less than the pre-determined threshold, the event may be placed in a staging file stored in a BBRAM. Once it is determined that the first counter is equal to or exceeds the pre-determined threshold, the events stored in the faster read/write access staging file may be processed and moved to the slower read/write access (albeit larger) capacity flash file. In some embodiments, the processing of events into event records may include generating records, which would contain a secure hash (e.g., generating a hash using event data and storing the hash in specific fields of a secure log record, as described at block 410 and 415). In some embodiments, the processed records may be written to the secure log file (e.g., stored in the flash file system of a domain (e.g., 320A)). The events may be removed from the staging file in the BBRAM when the number of event records has reached a pre-determined threshold, then written to the secure log file. A second counter, stored in the secure log file and indicative of a number of events recorded in the secure log file, may be incremented using the first counter. The first counter may then be reset to reflect the removed events (e.g., counter=0 if all records are removed from the staging file). The events removed from the staging BBRAM file may be placed into the flash file in ascending order according to their sequence number. Use of a staging file in the BBRAM file system may reduce the time that would otherwise be spent writing to a flash file for every event logged, thereby increasing the efficiency of the system described herein.

At block 410, a hash may be generated using the data of the event. As depicted in the table, different data obtained from an event may be used to generate a hash. The hash may be generated using any known hashing algorithm. In some embodiments, the hashing algorithm used may be Sha2-512.

At block 415, the hash may be stored in a current_hash field of an event record stored in the secure log. The event record may be associated with the event. At block 420, the hash may be stored in a running_hash field of the next event record in the secure log.

In some embodiments, the host system 205 may request to retrieve event records from a secure log. To ensure the integrity of the secure log, an elliptic curve digital signature algorithm (ECDSA) signature may be generated upon the hash of a group of one or more retrieved event records. The host system may verify the ECDSA signature on the retrieved group of event records. Additionally, the host system 205 may verify the integrity of the secure log records within the ECDSA verified group by comparing the running_hash field of an event record with the current_hash field of the previous event record in the secure log record group to ensure they are the same. In some embodiments, the host system 205 may verify that the running_hash field of the first event record of the secure log file may be a hash field of zeroes.

In some embodiments, to delete a range of events of a secure log or to delete all the event records within a secure log, dual control may be employed. A request may be received by the HSM 108A from a first user associated with a role to "inactively" clear a set of event records from the secure log. The metadata associated with each of the event records of the requested set may be updated with an "inactive clear" flag as long as the prerequisite condition of event retrieval has been met. Event records cannot be inactively cleared until a user has retrieved those events from the secure log first. Assuming the event records to be inactively cleared have already been retrieved as indicated by the event's metadata "retrieved" flag, then at this point, the records are not deleted. In other words, the event records can still be retrieved a second time by another user if desired. Accordingly, the HSM 108A may verify that the set of records has been retrieved at least once by analyzing metadata associated with each event record of the set of event records to be cleared.

In order for deletion of the records to be completed, a second user with a designated second user role may request the records to be actively cleared from the secure log. After the request from the second user is received, the "inactive clear" metadata flag of each event of the set of records to be deleted will be examined and if the inactive flag is set, each of the event records which had the inactive clear metadata flag set, will then also have their active clear flag set. The result of this activate clear action is that the slots in the event log occupied by the actively cleared events are now reusable to hold future new event records.

In some embodiments, the secure log may be full. For example, if the secure log stored in the flash log file reaches a certain percentage of full capacity (e.g., a watermark level), a warning return code may be returned to the host system 205. Events will continue to be logged until the log file is full. An overflow flash file may be utilized when the secure log is full. The overflow flash file may use a numbering scheme to retain sequential entry numbers in the secure log. The overflow flash file for a domain may be an array of N event types that has a 1-event deep subarray for each of the N event types. The system employing secure logging may have a total possible number of event types, M; the value of N may be less than or equal to M. The overflow file may be used for events of a certain type whose most recent occurrences are deemed too important to lose in the case where a secure log is full. The most recent version of these events may be saved in the overflow file. An example of such an event is the firmware update event. For example, there may be N such important events and M maximum event records in a secure log. The most recent sequence number may be S. At the point of a full secure log with sequence numbers S-(M-1), S-(M-2), . . . S-1, S; any of the N event occurrences may be logged into the overflow file . For example, if the secure log is full and the host system 205 has not retrieved and cleared a portion of the secure log in order to accommodate each firmware update event, then repeated firmware updates may continue to generate firmware update event records in the overflow flash file designated for each domain, overlaying older firmware update events in the 1-deep subarray element for this type of event in the overflow files. Then, as the host system 205 retrieves and clears the oldest entries from the secure log for a particular domain, the 1 to N overflow events, if present, may be sorted according to their timestamps from oldest to newest. The oldest overflow event may then be moved to the location that was once occupied by event #(S-(M-1)) and may be numbered S+1. The next newest overflow event (e.g., 2nd from oldest of the overflow events) may be moved to the location that was once occupied by event #(S-(M-2)) and may be numbered S+2, and so on, until all N important overflow events have been moved out of the overflow file and written to the secure log for that domain.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for secure logging on a host security module (HSM), the method comprising:
    receiving an event, wherein the event comprises data to be written to a secure log file;
    generating a hash using data of the event;
    storing the hash in a first field of an event record associated with the event, wherein the event record is stored in the secure log file;
    storing the hash in a second field of a next event record in the secure log file;
    receiving a request from a user associated with a first user role to clear a set of event records from the secure log file;
    verifying that the set of event records has been retrieved at least once by analyzing metadata associated with each event record of the set of event records to be cleared;
    updating metadata associated each event record of the set of event records;
    receiving a second request from a second user associated with a second user role to clear the set of event records from the secure log file;
    verifying the data received in the second request by analyzing the metadata associated with each event record of the set of event records; and
    removing the set of event records from the secure log file.

2. The computer-implemented method of claim 1, further comprising:
    in response to receiving the event, increasing a value of a first counter indicative of a number of events received;
    storing the event in a staging file stored in a Battery Back Random Access Memory (BBRAM);
    determining that the first counter equals a pre-determined threshold;
    processing a set of event records of the staging file;
    writing the processed set of event records to the secure log file from the staging file, wherein the secure log file is stored in a slower file system than the staging file;
    removing the set of event records from the staging file;
    incrementing a second counter in the secure log file using the first counter; and
    resetting the first counter in the staging file.

3. The computer-implemented method of claim 1, wherein the secure log file is stored in a flash file system.

4. The computer-implemented method of claim 1, further comprising:
    retrieving a set of event records from the secure log file;
    generating an elliptic curve digital signature algorithm (ECDSA) signature on the hash of the retrieved group of event records;
    verifying the ECDSA signature on the group of retrieved event records;
    verifying that a second field of each event record is equal to the first field of an immediately previous event record in the retrieved set of event records; and
    verifying that the second field of a first event record of the secure log file comprises a hash field of zeroes.

5. The computer-implemented method of claim 1, further comprising:
    determining that the secure log file is full;
    determining to add the event to an overflow flash file;
    receiving a second event;
    determining the second event is an updated version of the event;
    overwriting the event in the overflow flash file using the second event;
    determining the secure log file is not full;
    writing overflow events from the overflow flash file to the secure log file; and
    removing the overflow events from the overflow flash file.

6. The computer-implemented method of claim 5, further comprising:
    sorting the overflow events from the overflow flash file using a timestamp associated with each of the overflow events; and
    updating a sequence number associated with each of the overflow flash file event records as they are written to the secure log file; and
    updating the second field associated with each of the overflow events as the overflow events are written to the secure log file; and
    updating a first field associated with each of the overflow events as the overflow events are written to the secure log file.

7. A computer program product comprising a storage medium readable by a processing circuit and storing instructions for execution by the processing circuit for performing a method comprising:

receiving an event, wherein the event comprises data to be written to a secure log file;

generating a hash using data of the event;

storing the hash in a first field of an event record associated with the event, wherein the event record is stored in the secure log file;

storing the hash in a second field of a next event record in the secure log file;

receiving a request from a user associated with a first user role to clear a set of event records from the secure log file;

verifying that the set of event records has been retrieved at least once by analyzing metadata associated with each event record of the set of event records to be cleared;

updating metadata associated each event record of the set of event records;

receiving a second request from a second user associated with a second user role to clear the set of event records from the secure log file;

verifying the data received in the second request by analyzing the metadata associated with each event record of the set of event records; and removing the set of event records from the secure log file.

8. The computer program product of claim 7, the method further comprising:

in response to receiving the event, increasing a value of a first counter indicative of a number of events received;

storing the event in a staging file stored in a Battery Back Random Access Memory (BBRAM);

determining that the first counter equals a pre-determined threshold;

processing a set of event records of the staging file;

writing the processed set of event records to the secure log file from the staging file, wherein the secure log file is stored in a slower file system than the staging file;

removing the set of event records from the staging file;

incrementing a second counter in the secure log file using the first counter; and resetting the first counter in the staging file.

9. The computer program product of claim 7, wherein the secure log file is stored in a flash file system.

10. The computer program product of claim 7, the method further comprising:

retrieving a set of event records from the secure log file;

generating an elliptic curve digital signature algorithm (ECDSA) signature on the hash of the retrieved group of event records;

verifying the ECDSA signature on the group of retrieved event records;

verifying that a second field of each event record is equal to the first field of an immediately previous event record in the retrieved set of event records; and verifying that the second field of a first event record of the secure log file comprises a hash field of zeroes.

11. The computer program product of claim 7, the method further comprising:

determining that the secure log file is full;

determining to add the event to an overflow flash file;

receiving a second event;

determining the second event is an updated version of the event;

overwriting the event in the overflow flash file using the second event;

determining the secure log file is not full;

writing overflow events from the overflow flash file to the secure log file; and removing the overflow events from the overflow flash file.

12. The computer program product of claim 11, the method further comprising:

sorting the overflow events from the overflow flash file using a timestamp associated with each of the overflow events; and updating a sequence number associated with each of the overflow flash file event records as they are written to the secure log file; and updating the second field associated with each of the overflow events as the overflow events are written to the secure log file; and updating a first field associated with each of the overflow events as the overflow events are written to the secure log file.

13. A system, comprising:

a processor in communication with one or more types of memory, the processor configured to:

receive an event, wherein the event comprises data to be written to a secure log file;

generate a hash using data of the event;

store the hash in a first field of an event record associated with the event, wherein the event record is stored in the secure log file;

store the hash in a second field of a next event record in the secure log file;

receive a request from a user associated with a first user role to clear a set of event records from the secure log file;

verify that the set of event records has been retrieved at least once by analyzing metadata associated with each event record of the set of event records to be cleared;

update metadata associated each event record of the set of event records;

receive a second request from a second user associated with a second user role to clear the set of event records from the secure log file;

verify the data received in the second request by analyzing the metadata associated with each event record of the set of event records; and remove the set of event records from the secure log file.

14. The system of claim 13, wherein the processor is further configured to:

in response to receiving the event, increase a value of a first counter indicative of a number of events received;

store the event in a staging file stored in a Battery Back Random Access Memory (BBRAM);

determine that the first counter equals a pre-determined threshold;

process a set of event records of the staging file;

write the processed set of event records to the secure log file from the staging file, wherein the secure log file is stored in a slower file system than the staging file;

remove the set of event records from the staging file;

increment a second counter in the secure log file using the first counter; and reset the first counter in the staging file.

15. The system of claim 13, wherein the processor is further configured to:

retrieve a set of event records from the secure log file;

generate an elliptic curve digital signature algorithm (ECDSA) signature on the hash of the retrieved group of event records;

verify the ECDSA signature on the group of retrieved event records;

verify that a second field of each event record is equal to the first field of an immediately previous event record in the retrieved set of event records; and verify that the second field of a first event record of the secure log file comprises a hash field of zeroes.

16. The system of claim 13, wherein the processor is further configured to:

determine that the secure log file is full;

determine to add the event to an overflow flash file;

receive a second event;

determine the second event is an updated version of the event;

overwrite the event in the overflow flash file using the second event;

determine the secure log file is not full;

write overflow events from the overflow flash file to the secure log file; and remove the overflow events from the overflow flash file.

17. The system of claim 16, wherein the processor is further configured to:

sort the overflow events from the overflow flash file using a timestamp associated with each of the overflow events; and update a sequence number associated with each of the overflow flash file event records as they are written to the secure log file; and update the second field associated with each of the overflow events as the overflow events are written to the secure log file; and update a first field associated with each of the overflow events as the overflow events are written to the secure log file.

* * * * *